United States Patent [19]

Smyth

[11] Patent Number: 5,689,619
[45] Date of Patent: Nov. 18, 1997

[54] EYETRACKER CONTROL OF HEADS-UP DISPLAYS

[75] Inventor: Christopher C. Smyth, Fallston, Md.

[73] Assignee: The United States of America as represented by the Secretary of the Army, Washington, D.C.

[21] Appl. No.: 695,847

[22] Filed: Aug. 9, 1996

[51] Int. Cl.$^6$ .............................. G06F 15/00; G06F 17/20
[52] U.S. Cl. .............................. 395/10; 395/12; 351/210; 345/156
[58] Field of Search .............................. 395/10; 351/210; 345/156

[56] References Cited

U.S. PATENT DOCUMENTS

| | | | |
|---|---|---|---|
| 4,109,145 | 8/1978 | Graf | 250/201 |
| 4,595,990 | 6/1986 | Garwin | 364/709 |
| 4,648,052 | 3/1987 | Friedman | 351/210 |
| 4,836,670 | 6/1989 | Hutchinson | 351/210 |
| 4,946,271 | 8/1990 | Palsgard | 351/210 |
| 4,973,149 | 11/1990 | Hutchinson | 351/210 |
| 5,204,703 | 4/1993 | Hutchinson | 351/210 |
| 5,260,734 | 11/1993 | Shindo | 354/219 |
| 5,327,160 | 7/1994 | Asher | 345/156 |
| 5,367,315 | 11/1994 | Pan | 345/156 |
| 5,471,542 | 11/1995 | Ragland | 351/208 |
| 5,481,622 | 1/1996 | Gerhardt | 345/158 |
| 5,491,492 | 2/1996 | Knapp | 351/210 |
| 5,565,888 | 10/1996 | Selker | 345/146 |
| 5,579,048 | 11/1996 | Hirasawa | 348/333 |

OTHER PUBLICATIONS

Smyth, "The use of single event evoked cerebral potentials to predict stimulus identifications," Proceedings of the human factors society 34th annual meeting p1431, 1990, Dec. 1990.

Smyth and dominessy, "Comparison of oculometer and head-fixed recticle with voice or switch and touch panel for data entry on a generic tactical air combat display," Nov. 1989 AMCMS code 612716.H700011, technical memorandum 21–89, US Army human enginerring la, Nov. 1989.

Primary Examiner—Robert W. Downs
Assistant Examiner—Jeffrey S. Smith
Attorney, Agent, or Firm—Freda L. Kronsnick; Paul S. Clohan

[57] ABSTRACT

The invention consists of an eyetracker, a display driver, an adaptive display interface controller, and a digital computer. A user of the invention can operate a heads-up display (or a head mounted display) with an eyetracker, leaving his hands free to perform a manual control task. The user selects a display element from an array of choices on the heads-up display by gazing at an element while he activates a confirming mechanism. Both tasks share a common visual working area with overlaid visual images, and task interference is reduced since eye-movements and visual attention are dedicated to the same display surface.

The adaptive display interface automatically aids the user in display operations during high manual task loading. The adaptive interface is driven by an electronic Expert System on human visual processes programmed as a Fuzzy Logic controller. The controller generates display cueing aids, under computer control, in response to the erratic eye movement patterns that occur during cognitive conflict. The cueing aids help the user to operate the display with a sequence of discrete eye gazes and confirming actions which only momentarily interrupt the manual control task.

As cueing aids, the invention provides a timing logic for element enhancement, and display markers for task feedback. While the aids would be disruptive at low cognitive loading, they provide necessary timing and memory prompts at high loadings. The element enhancement timing logic allows the user to momentarily look at the display and then return his attention to the tracking task before executing confirmation. The display cues show the user where he is looking on the display relative to the element to be selected.

6 Claims, 10 Drawing Sheets

EYETRACKER CONTROL OF HEADS-UP DISPLAYS

GOVERNMENTAL INTEREST

The invention described herein may be manufactured, used and licensed by or for the United States Government without payment to me of any royalty thereon.

CROSS-REFERENCE TO RELATED APPLICATIONS

The subject matter of this application is related to that disclosed in copending application Ser. No. 08/439,392 filed May 5, 1995, Ser. No. 08/675,330 filed Jun. 27, 1996, Ser. No. 08/407,142 filed Mar. 17, 1995, and Ser. No. 08/675,329 filed Jun. 27, 1996.

BACKGROUND OF INVENTION (i) Field of Invention

The invention applies to the control of heads-up displays and head mounted displays used in manned crew-stations such as helicopters, aircraft and other manned vehicles; display overlays on video returns in a control station during teleoperations of unmanned remote vehicles and platforms; and display overlays onto a projection of digital map displays in communication, command and control stations such as modern air-traffic control or military tactical operations centers. Similarly, the invention applies to the control of head mounted displays used by an individual who while netted electronically into a data distribution system is performing standalone tasks such as assembly work, maintenance, or soldiering on the modern battlefield.

The common theme to these applications is the use of the invention to control video information displays which are projected as graphic overlays onto the visual image of a scene pertinent to the task being performed. For this reason, the invention has particular application to time shared concurrent tasks where the hands are busy with a continual time critical piloting task and the eyes may be used intermittently to control a discrete task. The use of this invention enables both tasks to share a common visual working area with overlaid visual images.

One particular example of such an application would be that of a single pilot helicopter flight at low nap-of-earth levels (or a two man helicopter where one crew member has become incapacitated), while the pilot is updating an onboard heads-up display or head mounted display, such as the Army aviator's night vision/heads-up display system (ANVIS/HUD) presently under development to provide integrated graphics on the night vision scene.

A similar application is to the teleoperational control of an unmanned remote vehicle from the video display of a vehicle mounted camera return which is seen on a fixed monitor at the control site or on a head mounted display.

Another such application is to the operation of completely enclosed armored vehicles with "transparent" or "see through" armor where the operator sees a video projection of the outside scene as recorded by externally mounted cameras and relayed to internal monitors either vehicle mounted or as a head mounted display; the operator would use the invention to control displays overlaid on the scene projection while concurrently driving the vehicle. Similar comments apply to the piloting of "glass cockpit" designs for completely enclosed high performance aircraft.

Another example is the Army's 21st Century Warrior concept where the individual soldier is wearing a head mounted display showing electronically transmitted situation and tactical information relayed by satellite communication from a military tactical operations center. The soldier would want to page through displays of tactical information and furthermore, is expected to transmit back information acquired from reconnoitering on the battlefield. Similarly, an individual performing maintenance may wish to page through technical displays on a head mounted display while his hands are busy with repairs.

(ii) Description of the Prior Art

There is no prior art for the direct control of displays that overlay the visual workspace of a concurrent manual control task. In most designs, the heads-up display or head mounted display shows task critical information that alerts the pilot or operator of changing conditions; a panel display with discrete switches that is mounted within a vehicle or control station or on a portable communicator, is then used to acquire detailed information and to select discrete control activity.

This is especially true for modern helicopters and aircraft which are equipped with a few large screen computer driven, raster-scan multifunctional displays (MFD) mounted on the cockpit panel. The MFDs replace the large number of dials and indicators that presently fill the limited space on the panel in older aircraft. During flight, the pilot selects among different display formats for detailed information on such topics as situation awareness, ship system status, message composition and reception, and weapon and sensor control. These design features have been extended to other areas such as manned vehicles and command & control stations.

The appropriate display formats on the panel mounted displays are commonly selected by the activation of a switch or by voice command with an automatic speech recognizer. The switch may be a toggle switch mounted on a vehicle's steerage controls or one of a set of pre-programmable or bezel switches mounted about a display. For example, the present method for display control by both the pilot and copilot in the UH-60 Black Hawk and the OH-58D, uses bezel switches which are placed about the panel mounted multifunctional display CRT. In the OH-58D a toggle switch on the controller arm is used to select the four primary display formats, however, display entries on those formats are made from bezel switches and a keyboard.

Another method for display control is to move a display cursor, with a "Chinese"-hat button on the flight controller arm, over an appropriate display icon and then push a "capture" switch. A variation of this technique is to move the cursor with a side arm touch pad. Similarly, a touch panel overlaid on top of the display panels may be used in place of bezel switches. In this design, the pilot touches the panel at a point over an appropriate display icon to control the display.

However, as the pilot, for example, flies the aircraft, he must occasionally either in response to critical alerts on the heads-up display, radio messages, or perceived mission needs, interact with the multifunctional displays in his cockpit either to control his aircraft, acquire knowledge, or communicate with other aviation elements to perform the flight mission. The multifunctional display by design provides selected detailed information in a treed menu format as needed during the display control task. This increase in information on the displays demands increased visual attention inside the cockpit since the pilot can no longer confirm by a glance or peripheral vision, the information status as he could with dedicated dials and indicators. He must visually search over the display to locate, select, and then assimilate task related information, and then use muscular motor actions to select the next display format for the completion of the display related task.

These activities are normally performed by a second crew member; however, in a one man configuration (or if the second member is incapacitated), the use of these controls such as bezel and keypad switches to control the displays forces the pilot to look inside the cockpit to locate and read displayed information and to physically reach and touch a control point.

The intrusion of the display control actions into the flight control activity places conflicting demands on the visual system and interference between motor actions. This redirection of vision to the displays and switches inside the cockpit distracts him from his primary task of flying the helicopter with vision directed to the scene outside the cockpit. This is true not only because of the change in visual fixation and accommodation needed for orientation to the panel displays, but also due to the shift in visual attention and concentration needed for adjustment to the change in visual field seen by the pilot before he can process information.

One may believe that the use of an automatic speech recognizer for display control would remove the need for looking at the displays and manual control actions. However, the pilot must still check his displays to see if the command was recognized and for follow-up information. Synthetic speech can give some feedback, but the process is slow and distracts from flight control during the delivery. At some point, the pilot must visually check the displays for detailed information. This is especially true for the high details found on map displays. The use of speech recognizers causes minimal degradation of flight stability; however, the time to perform the task is increased by the use of verbal utterances. Furthermore, dependable present day speech recognizers are isolated word, speaker dependent, and their performance has been shown to be decreased during a stressed state of the pilot which can cause changes in voice pitch and delivery rate, as well as with the voice strain and hoarseness which results from long periods of the deliberate, halting speech style needed to operate the recognizer. For these reasons, present day speech recognizers are limited to special tasks or employed as backup systems.

These comments on the control of displays in helicopters also apply to display controls in aircraft, manned vehicles, teleoperated control stations for unmanned remote vehicles and platforms, and command and control stations.

Again, these comments also apply to the control of head mounted displays by an individual such as the soldier or maintainer who is netted electronically into a data distribution system while performing isolated tasks without the supporting plant of a crew station and must otherwise use a hand held keypad or an attached speech recognizer for display control.

(iii) Advantages of Invention

The invention can be used to operate a heads-up display (or a head mounted display) by eyegaze, leaving the hands free to perform a concurrent manual control task. The user selects a display element from an array of choices on the heads-up display, by gazing at an element while activating a confirmation mechanism (examples: switch push, voice entry, eye blink, or gaze duration). The heads-up display and the manual control task share the same visual working area with overlaid visual images, and interference between the two is reduced since eye-movements and visual attention are dedicated to the same display surface. This is especially important during high manual workloads or physical incapacitation due to injury.

The invention generates display cueing to aid the user in its operation during periods of high loading on the manual control task. Laboratory research has shown that the user prefers to operate the display by a sequence of well defined, time spaced, eye movements and confirmation actions, each of which only momentarily interrupts his manual control task. The user can easily operate the display in this manner at low manual control task loadings; however, this strategy can only be maintained at high manual control loadings with cueing aids, since the high loading of the manual control task continually interrupts his attention to the display. While the aids would be disruptive at low cognitive loading, they provide necessary timing and memory prompts at high loadings.

As an example of display aiding, the invention implements a timing logic for enhancement control of gazed display elements when confirmation is delayed. The logic enhances any display element that is gazed at for longer than several hundred milliseconds as feedback to the user, and if no other element is gazed, maintains that enhancement for an extended period of time, thereby allowing the user to return his visual attention to the manual control task before confirming the selection.

Furthermore, the invention provides the user with gaze aiding cues which he may select for display operations when under high cognitive loading where his eye movements may be erratic due to conflicting needs for attention; these cues show him the computed eye gaze point on the display surface and the icon capture window boundaries, thereby providing feedback for display control.

The invention may be operated in either a manual selection mode or an automated mode, allowing the user to tailor the cueing aids to match his anticipated cognitive loading. In the manual mode, the user can select the confirmation means and level of feedback aiding. The ability to have supervisory control over the feedback process in display operations has been found to be of importance in the user's acceptance of a cueing system.

In the automated mode, the invention acts as a "smart cuer" providing display cueing that responds naturally to the control task loading on the user as indicated by his response time and eye movements. At low levels of task loading, the user need merely gaze at the display element with a concurrent confirmation to operate the menu display. As the task loading increases, the invention enhances the gazed element as feedback to the user and the time window for a capture action is expanded. Finally, as the task loading reach an excessive level, the eye movements of the user during display operation become erratic and the invention displays gaze control cues to aid him.

In this mode, the invention functions as an automated adaptive display interface which uses an Expert System on human visual processes, in the form of a Fuzzy Logic controller, to automatically display the gaze aiding overlays under computer control in response to erratic eye movement patterns; this is an advantage under high task loading when conflicting cognitive demands may preclude the user from manually selecting gaze aiding.

Finally, the invention by enabling heads-up display operations supports the redesign of display formats so that some information icons and supporting treed menus are displayed on heads-up displays, head mounted displays, and other scene overlays in place of having all display control icons on panel mounted displays. This redesign reduces the need for visual search and attention on display surfaces other than that of the control task related scene. The user need only differentiate between conflicting demands for attention to the display overlays and scene elements.

DETAILED DESCRIPTION OF THE PREFERRED EMBODIMENTS

The invention is designed to be used in time shared concurrent tasks where the hands are involved in a continuous, time critical, manual control task, and the eyes may be used intermittently in a discrete task to operate a heads up display. The user selects a display element from an array of choices on the heads-up display by gazing at an element while he activates a confirming mechanism. In this way, the invention enables the selection of display elements that overlay a manual control task related scene. The user does not need to shift visual fixations to another visual display since both tasks share a common visual working area with overlaid visual images.

Figure 1:
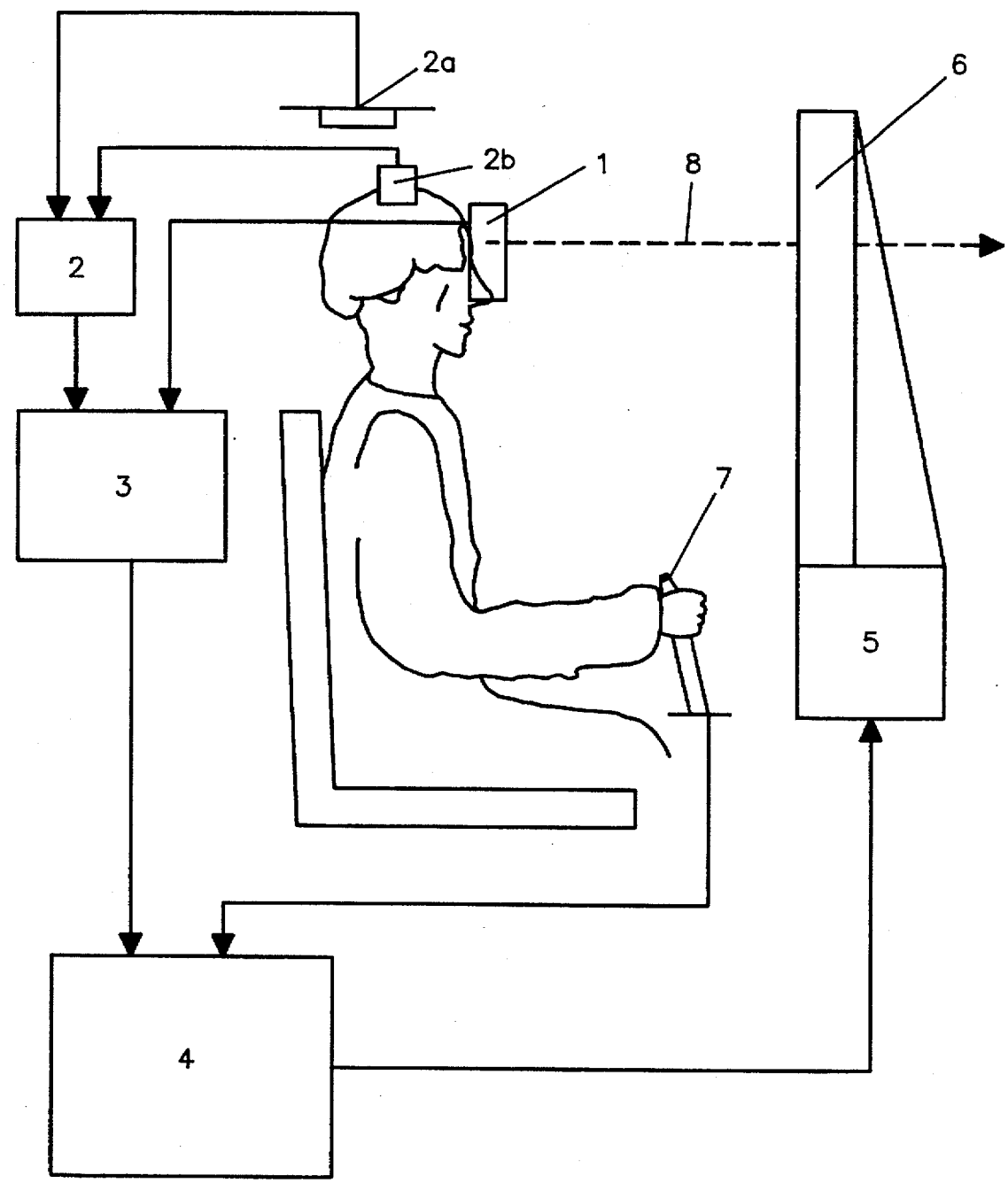
FIG. 1 is a schematic of the invention showing the hardware components.

The invention, shown in FIG. 1, consists of an eyetracker 1 with ocular input and digital electrical output, a head-tracker 2 with digital electrical output, a digital processor 3 with digital electrical output and digital electrical inputs connected to the outputs of the eyetracker and headtracker, a computer 4 with digital electrical output-and input connected to the digital processor, a display processor 5 with video image projection output and an input connected to the computer output, a heads-up display 6 showing the video image output of the display processor, and a confirmation mechanism 7, here shown as a mechanical switch on a hand controller, with digital output to the digital computer. The heads-up display is assumed either head mounted or fixed at the front on the workspace panel as is commonly found in helicopters, aircraft, vehicles and control stations.

The eyetracker 1 measures the direction of ocular gaze 8 as the angular offset from a reference system conceptually attached either to the user's head or fixed in the workspace. The eyetracker may be head mounted or panel mounted in front of the user. An eyetracker fixed to the head measures the angular offsets of the viewing direction from the reference direction in the head fixed coordinate system. The eyetracker may function by any of the following well established optical measuring techniques: pupil tracking, lumbus boundary, double punkenje image, corneal reflections or retinal image. An Electrooculogramic device may be used for head mounted measurements.

Some eyetracker designs contain a single infrared light source which is directed at the human eye and the light reflected from the eye is imaged onto a charge-injection (CID) or charge-coupled device (CCD) sensor array. The image of the eye is then electronically processed to determine the corneal reflection, the pupil centroid orientation, or both. These parameters are used to determine the angular location of the eye relative to the imaging camera. The infrared light source in the head mounted eyetracker is placed next to the eye; a filter shields the source, eye, and sensor from the ambient light. The optics for the panel mounted system are mounted in front of the user and directed toward his face. A servomechanism keeps the optics aligned on the user's eye.

The head tracker 2 measures the position and orientation of the viewer's head in the coordinate system of the workspace. The device consists of a source 2a, sensor 2b and processor 2. The sensor 2b is commonly attached to the head and the source 2a is fixed in the workspace. The processor 2 continually computes the position and orientation of the sensor in a spatial coordinate system located by the source, and controls the transmission of the digital electrical output data. The system allows continual tracking of the sensor in all six degrees of spatial freedom. The tracker may function by any of the following well established techniques: magnetic source field and sensor, triangulation of infrared light sources, ultrasonic source and sensors, or optical techniques. Some optical trackers are fixed in the workspace and use a feedback servomechanism to center a camera on the pupil image; ranging to the eye may be done by dynamically focusing the pupil image or by ultrasonic reflections from the eye.

The digital processor 3 computes the ocular viewing point and direction in the spatial coordinate system of the workspace. These computations are made from the ocular offset measured by the eyetracker 1 and the head position and orientation measurements from the head tracker 2. The ocular offset measurements for a panel mounted eyetracker are in the workspace coordinate system; however, in this case the digital processor 3 uses the readings of the head tracker 2 to provide feedback to the servomechanism directing the optics of the eyetracker toward the viewer's eye.

The digital computer 4 computes the viewed point in the workspace coordinates from the viewing point and direction and groups the visual fixations into gaze points of regard. The computer has a digitally stored data base of the workspace geometry listing the panels and their locations in the user's workspace. The computer uses a routine derived from computer graphics concepts to compute the point of intersection of the viewing direction with each workspace surface facing the user from the surface normal and the location of a vertex. The routine transforms the gaze points of regard that are on the heads-up display into display surface coordinates for display control.

Figure 2:
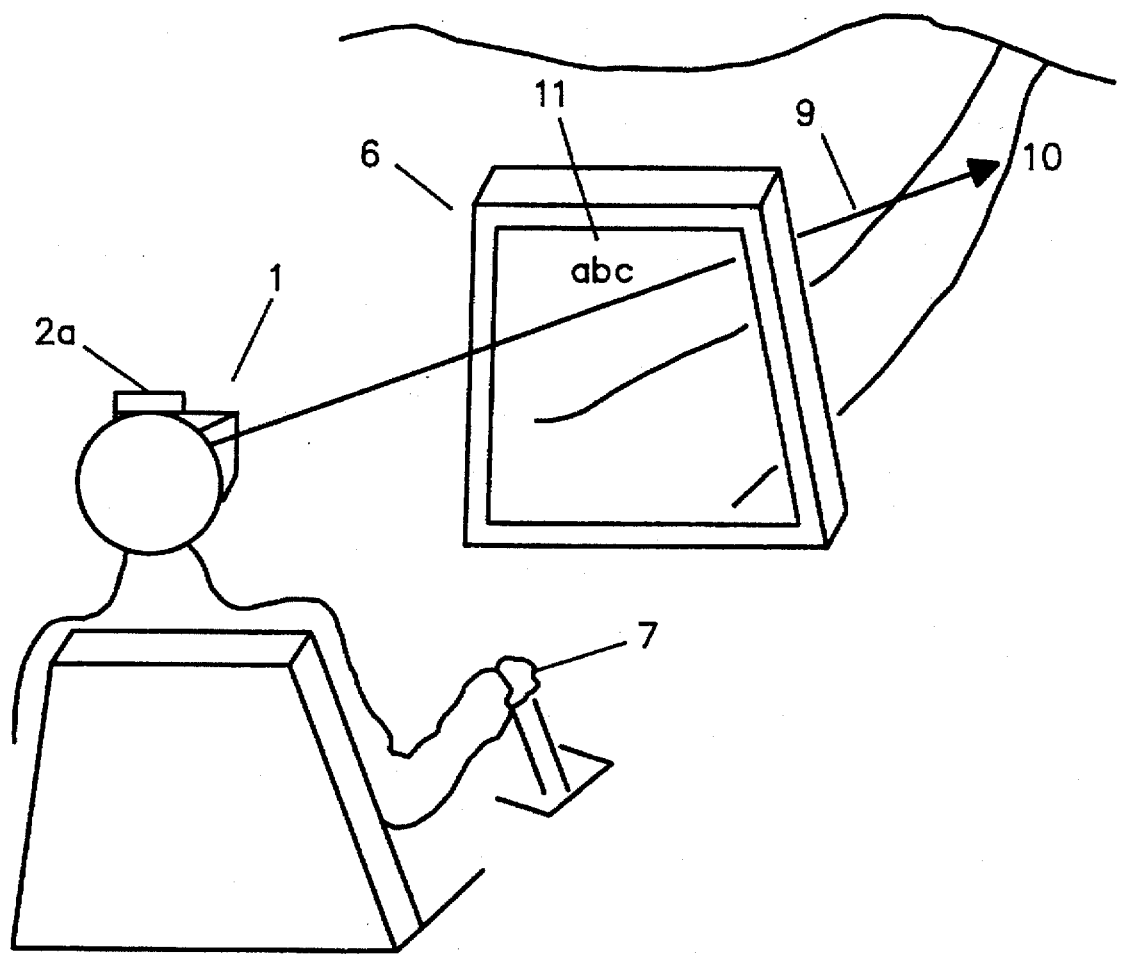
FIG. 2 shows an application of the invention during vehicle or plant operations.

In an application shown in FIG. 2, the user is looking 9 through the heads-up display 6 at the scene 10 and using the manual control to control the movement of a vehicle or a plant process in the scene. In this operating mode, the heads-up display 6 shows information critical to the process control which is overlaid 11 on the scene 10. The display generator 5 generates a virtual image of the display graphics which is projected into the visual area of the heads-up display 6 as directed by the digital computer 4.

Figure 3:
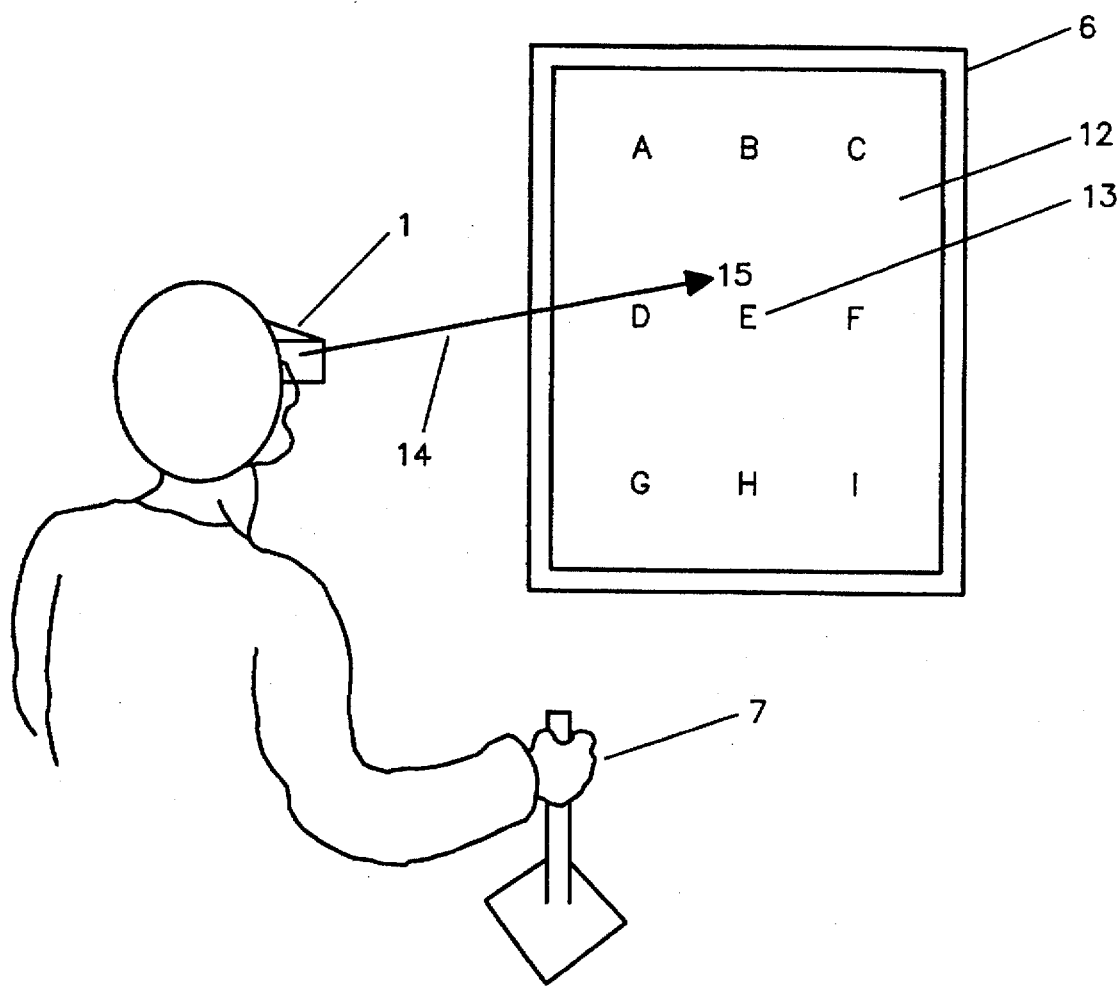
FIG. 3 shows the video display menu with selection array.

However, during the process operations, the user may select to change the display format 11 on the heads-up display 6 to acquire task related information or record observations. As shown in FIG. 3, this action opens the display for interaction by bringing up the first of a sequence of treed menu overlays 12 with each overlay arranged in an array of options 13 on the heads-up display 6. The display selection action may be by several means depending upon the particular design, including a mechanical switch on the manual controller or by selecting a display element from a dedicated active window on the display using me eyetracker with a confirmation action.

The user operates the menu display 12 by selecting a sequence of display array elements 13 with the eyetracker. The user does this by gazing 14 on a display element of interest in the array 13 and activating a confirmation mechanism 7, here shown as a switch. The computed gaze point of regard 15 on the display surface 6 is interpreted as the display point of interest. The computer 4 compares the gaze point location 15 to those listed for the visual display array elements 13. The display element 13 closest to the position of this point is selected for processing. The point of interest 15 must be within the display capture window, centered on the display element 13, to preclude accidental selection actions. Of course, the display element must be a member of the subset appropriate for the task being performed. In all cases, the display elements are spaced sufficiently apart to meet the spatial tolerance needed for control by the eyetracker.

Figure 4:
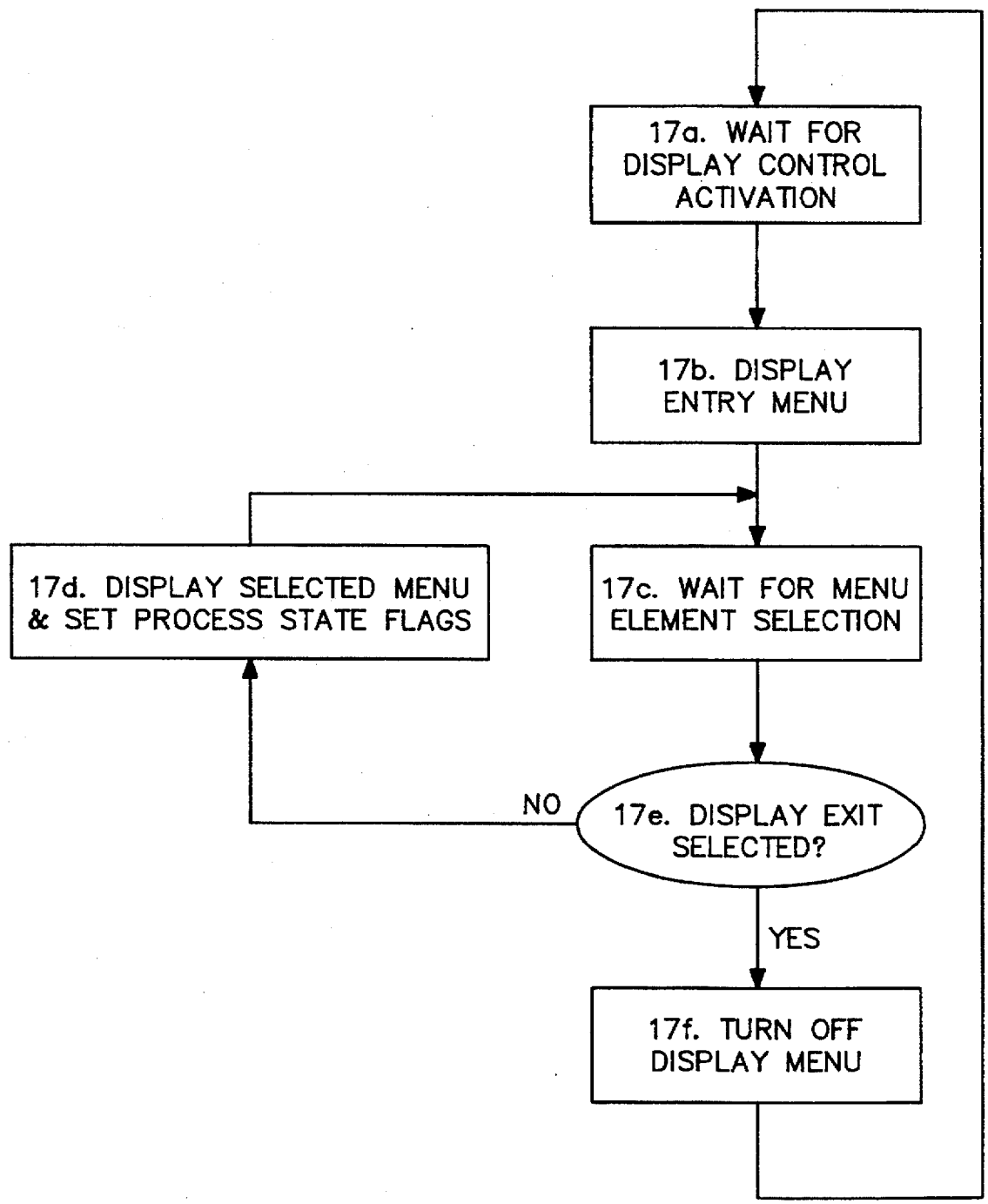
FIG. 4 is a flow chart of the video display control process.

The computer 4 controls the menu display 12 from the eye gaze point 15, the confirming motor response 7, and the resident computer program operating according to the flow chart of FIG. 4. The program, following display of the entry menu 17b activated upon receipt of the display selection 17a, waits for the selection of a menu element 17c. Once a match is made between the gaze point 15 and a display element 13, the computer 4 upon receiving a confirmation 7, executes the appropriate task related routines which update the state of the controlled vehicle or plant process and correspondingly, that of the visual display elements 13 including the display menu as feedback to the user following routine 17d. The selection of display exit in routine 17e causes the display menu to be removed from the heads up display 6 in accordance with routine 17f.

The confirmation mechanism 7 may be activated by any of several muscular motor responses depending upon the particular design. These may include a mechanical switch push, a voice command to an automatic speech recognizer, a held eye blink captured by an infrared detector, or an extended gaze duration due to ocular muscular suppression which is captured by the eyetracker. The design may allow the user to select the particular mechanism to match the operational environment.

In those situations where there is no conflict for the user's attention and the user need not study the display, such as for example, when selecting from a known checklist during system initialization, the user may elect to operate the display by holding a direct gaze on the icon of choice for a specific period of time, commonly on the order of a few seconds. In this case, the confirming action is the holding of the gaze.

In those situations, however, where the user must study a display before making a choice and his gaze may linger on each icon during the study, he may elect to operate the display by a direct gaze in conjunction with a definite muscular motor action, such as pressing a switch, speaking a voice command to an automatic speech recognizer, or even briefly holding an eye blink.

The invention provides operational and memory feedback cueing to aid the user as his cognitive loading is increased by involvement in the manual control task. In this manner, the invention supports a practical display operations strategy which laboratory research has shown that the user will implement when possible; that is, he will operate the display by a sequence of well defined, time spaced, eye movements and confirmation actions, each which only momentarily interrupts his manual control task. The user can easily operate the display in this manner at low manual control task loadings; however, this strategy can only be maintained at high manual control loadings with cueing aids, due to the interruptive conflict for his attention between the two tasks. The invention may be operated in either a manual selection mode, allowing the user to tailor the cueing aids to match his anticipated cognitive loading, or in an automated mode.

Thus, in those critical situations involving a conflict for his cognitive attention, where the user may be trying to operate a heads up display while having a need to study scene elements behind the display to perform the manual control task, he may in the manual mode, elect to operate the display with display cueing aids. For example, the invention provides a timing control logic for enhancement of gazed display elements when confirmation is delayed. The logic enhances any display element that is gazed at longer than a threshold period of time as feedback to the user, and maintains that enhancement for an extended period of time if no other element is gazed, thereby allowing the user to return his visual attention to the manual control task before confirming the selection.

Figure 5:
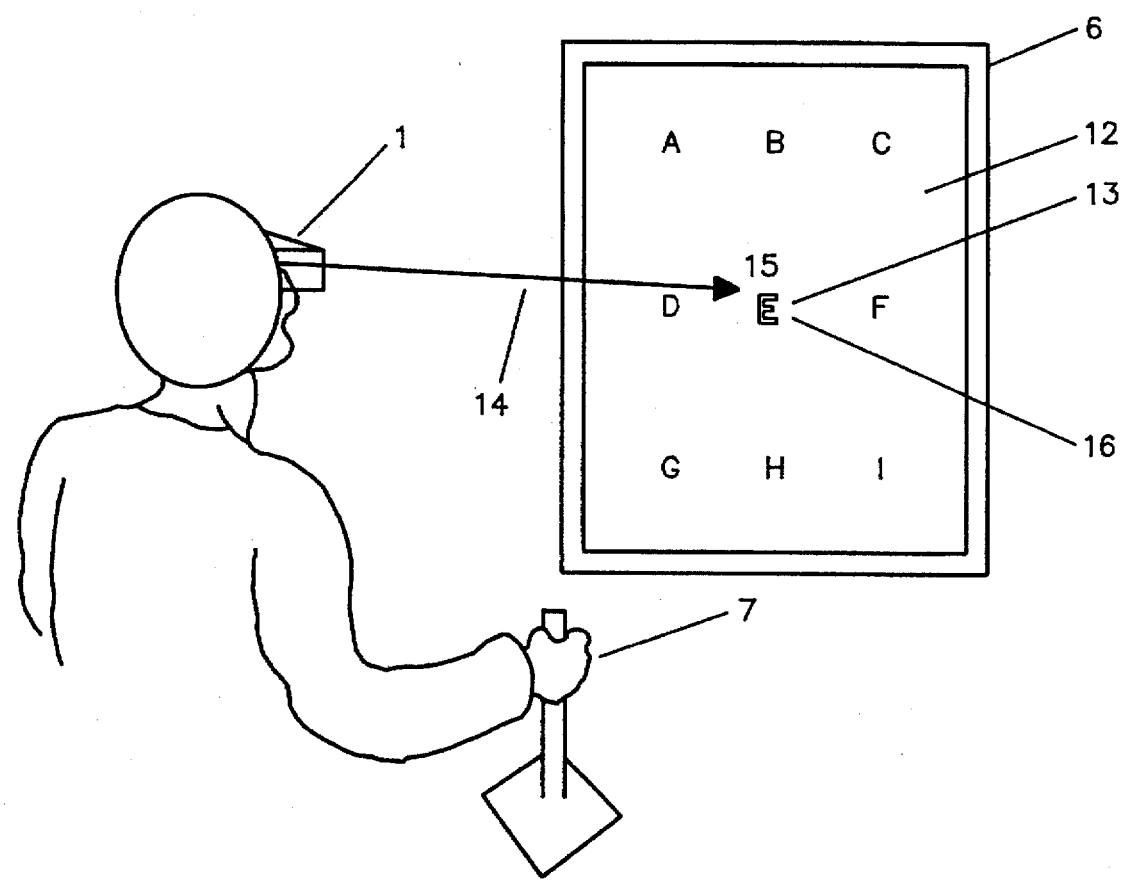
FIG. 5 shows the video display menu with element enhancement.

For this reason, the user when operating the menu displays 12, may select the element enhancement shown in FIG. 5 under the control of computer routine 17c. In this process, the computer instructs the display driver 5 to enhance any display element 13 which is gazed 15 at for longer than the threshold time, as feedback to the user. The threshold time is commonly 300 milliseconds. The enhancement 16 may be a change in color, brightness, or shape. At the time of enhancement, the display driver returns any element previously enhanced back to its normal display state. The enhancement of the display element is maintained for a holding time, commonly 3 seconds, if no other display element is gazed at during this time. The computer updates the display as determined by the resident computer routine 17d including returning the enhanced element to normal, upon receiving a confirmation 7 within the holding time. However, the enhanced element is returned to normal if no action occurs before the holding time out period is up.

Figure 6:
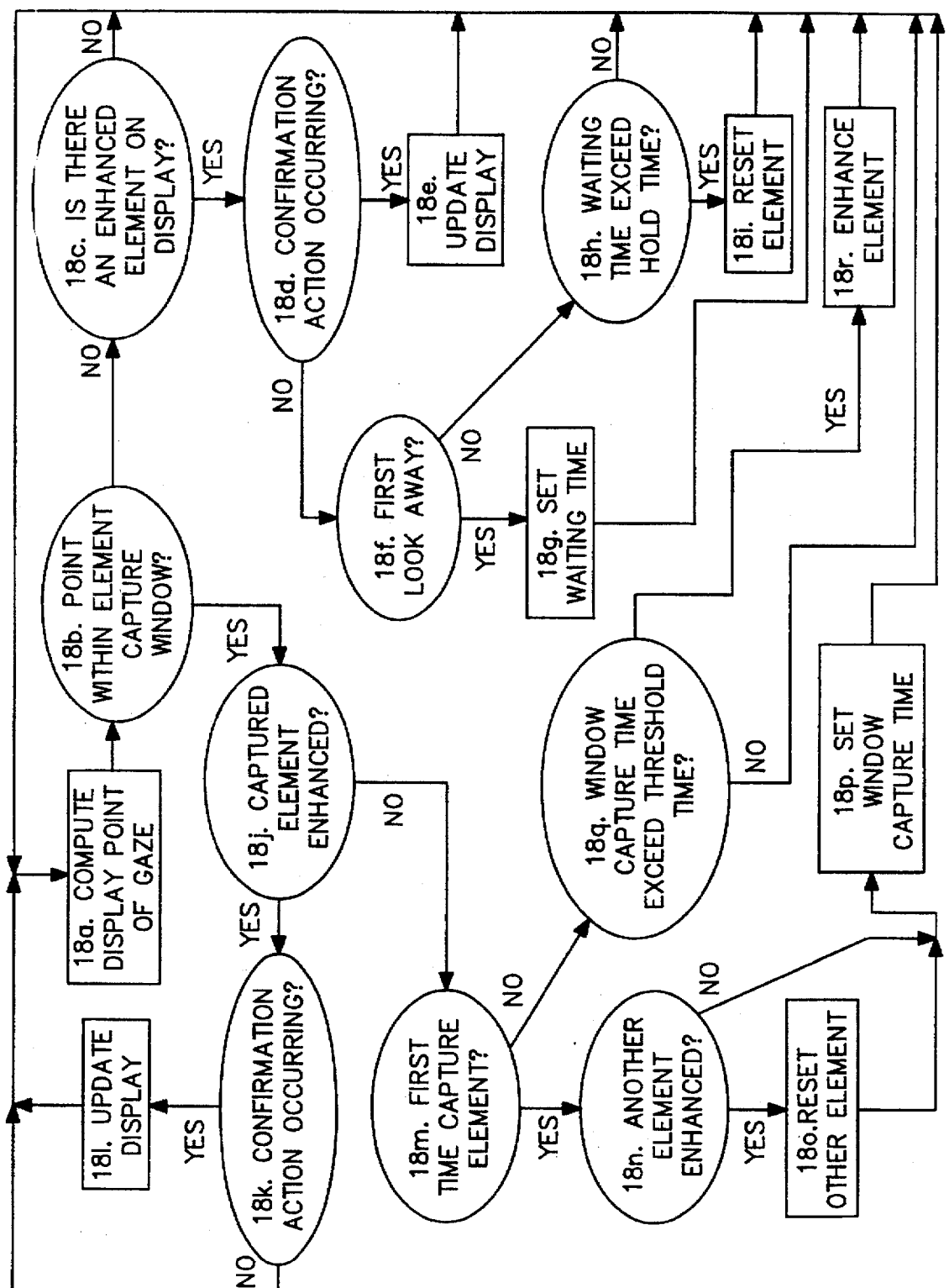
FIG. 6 is a flow chart of the timing control logic for the display element enhancement.

The details of the enhancement control logic for computer routine 17c follow the flow chart of FIG. 6. Following computation of the display point of gaze 18a, the computed point is compared to the display element capture windows 18b. If the point is not within a capture window, the user is looking away from the menu display and a check is made for any enhanced element on the display 18c. If there is such an element, then a check is made in 18d for a confirming action 7, and if such an action is taking place in this time sampling period, then the display is updated 18e by passing to 17d. However, if no such action is occurring, then a check is made to see if the user has just looked away from the element 18f and in this case a waiting time counter is initialized in 18g. However, if the user has previously looked away from this element and is continuing to do so, the waiting time is updated and compared to the enhancement holding time in 18h, and if this time is exceeded, the enhanced element is reset in 18i.

If however, the computed gaze point from 18a is within an element capture window 18b, then the captured element is checked for enhancement in 18j. If the element is enhanced a check is made for a confirming action 7 in 18k, and if so the display is updated 18l by passing to routine 17d. However, if the captured element is not enhanced, a check is made to see if this is the first time that this element has been captured 18m, and if so, is there another element that is already enhanced on the display 18n which is then reset 18o. In either case, a window capture time in initialized for a first time captured element in 18p. However, if the element has been captured in a prior sampling period, the window capture time is updated and checked against the threshold time 18q. Finally, if this time is exceeded, the element is enhanced in 18r.

This enhancement control logic for routine 17c is designed to aid the user in the performance of multiple concurrent tasks by supporting an orderly sequence of definite activities clearly separated in time. For example, the user may survey the display options by a series of quick looks momentarily interrupting the control task; the enhancement merely shows which element may be selected. Then the user need only gaze at the selected element for a fractional time, then look away when he sees feedback and activate confirmation while returning his visual attention to the control task scene.

Figure 7:
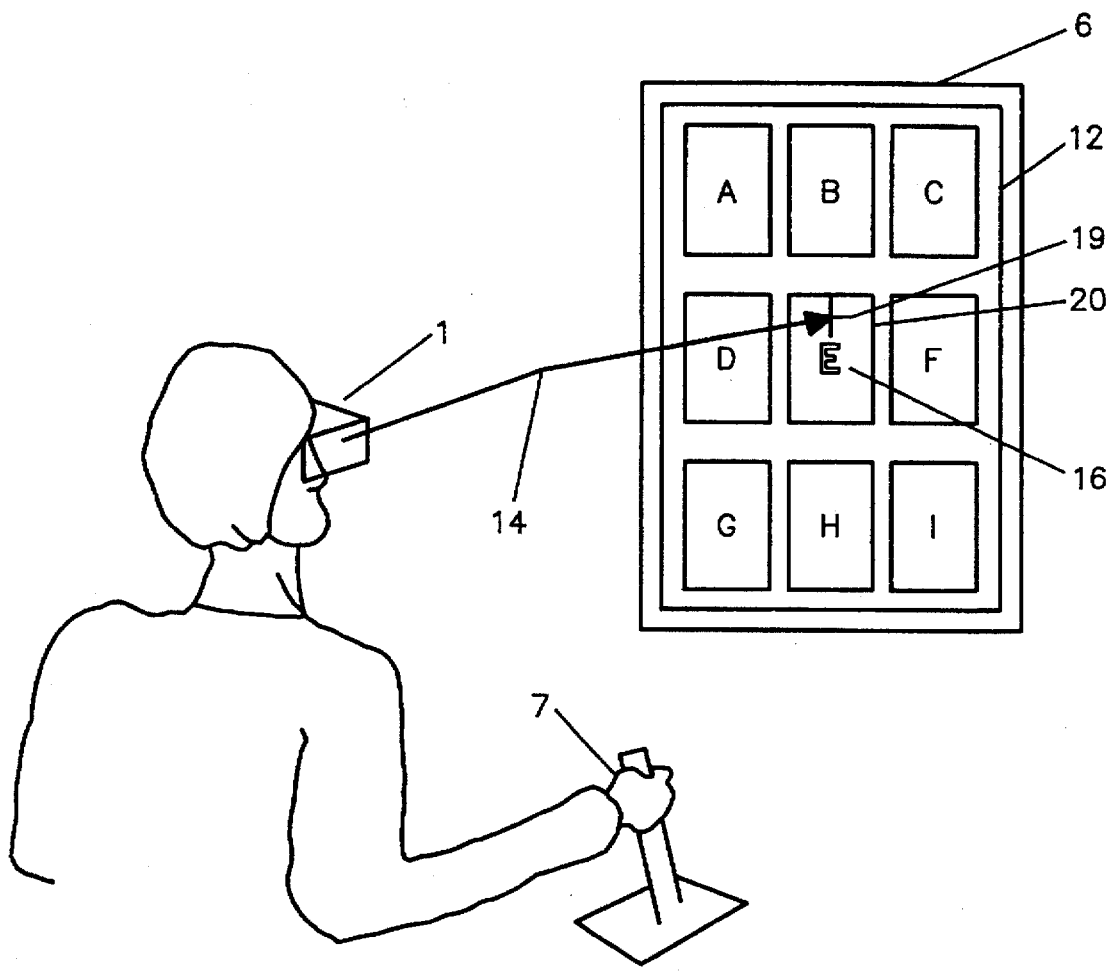
FIG. 7 shows the display with gaze marker and element capture windows used for the gaze aiding feedback during high task loading.

Under high task loading, the user may become cognitively overloaded due to the conflict of performing two concurrent tasks. The user may have difficulty controlling his eye movements and consequently demonstrate nervous eye movement patterns as he moves back and forth between the two tasks. In this case, the user may select computer generated display aids as shown in FIG. 7 to help him in his gaze control during display task operations. These cues show him the computed eye gaze point on the display surface and the icon capture window boundaries, thereby providing feedback for display control.

A small cue marker 19, commonly cross-hairs shaped, is used to show the location of the computed gaze point of regard 15. The cue marker is flashed at a slow rate with a low flash on duration to cue the user by appearing within the visual field without lasting long enough to generate spontaneous visual fixation toward the cue marker. The low on duration is needed since slight inaccuracies in gaze point prediction can result in unstable positive feedback in gaze point as the user tries to look at the marker.

Another aid is a gaze capture window 20 which is displayed about each array element 13. The capture window is large enough to contain the required spatial tolerance needed for display activation by the eyetracker. With these aids, the user need merely adjust his gaze point to move the cue marker 19 within the capture window 20 for the selected element. The gaze control aids are used in high task loading where there is competition for the visual attention between the continual control task and the discrete task for display operations. However, at lower task loading, the user need only gaze directly at the element to be selected in conjunction with a confirming action following enhancement, and the aids are not needed.

The user may further select during periods of fluctuating workload, to activate an automated adaptive display interface routine within the computer 4 which then displays the gaze control aids automatically during periods of high cognitive loading. This may be preferred to manually selecting that option every time the user encounters periods of high loading. The interface routine continually analyzes the eye movements for patterns found during high cognitive loading and in response activates the cueing aids during display control In this automated mode, the adaptive display interface uses an Expert System on human visual processes, in the form of a Fuzzy Logic controller, to automatically display the gaze aiding overlays under computer control in response to erratic eye movement patterns. Experiments have shown that the eye movement patterns under high cognitive loading are fairly stereotyped when operating the display without gaze control aids while performing a concurrent manual control task. The eye movements about the display element to be selected are erratic failing both within and beyond the display capture window for that element. The user tends to try to capture the element, but then he must look back to the scene. This activity generates conflicting needs on his visual system, first to naturally collect visual information required to perform his control task, then at the same time trying to use the system as a motor control for display operation. In a sense, the high cognitive loading has operationally caused an increase in the required spatial tolerance for element capture beyond that of the designed capture window.

For this reason, the eye movements during erratic attempts at display control tend to cluster about the element to be captured with some clusters failing beyond the display capture window. Still other eye movements will form clusters in areas of scene interest. These clusters will be connected by a large number of transitions back and forth both between the clusters about the display element and between them and the scene interest points. This results in an increase in the number of clusters needed for element capture due to the repeated attempts interrupted by the motor control task, with a correspondingly long duration between consecutive element captures, a wide dispersion of cluster centroids and gaze point spreads about the centroids. In contrast, the eye movements under tight display control produces clusters that are centered near the captured display element with little spread and few transitions between element and scene points and which has a short time duration before capture.

The eye movement history is continually recorded by the computer 4 and the short term history analyzed for such erratic behavior. The occurrence of such erratic patterns for a specific period of time commonly several seconds, is recognized as a high loading regime. The computer when in the automated mode, then instructs the display driver 5 to display the gaze cue marker and the display capture windows. The automated cueing stays on until, the loading regime is reduced or the user selects the manual mode.

Figure 8:
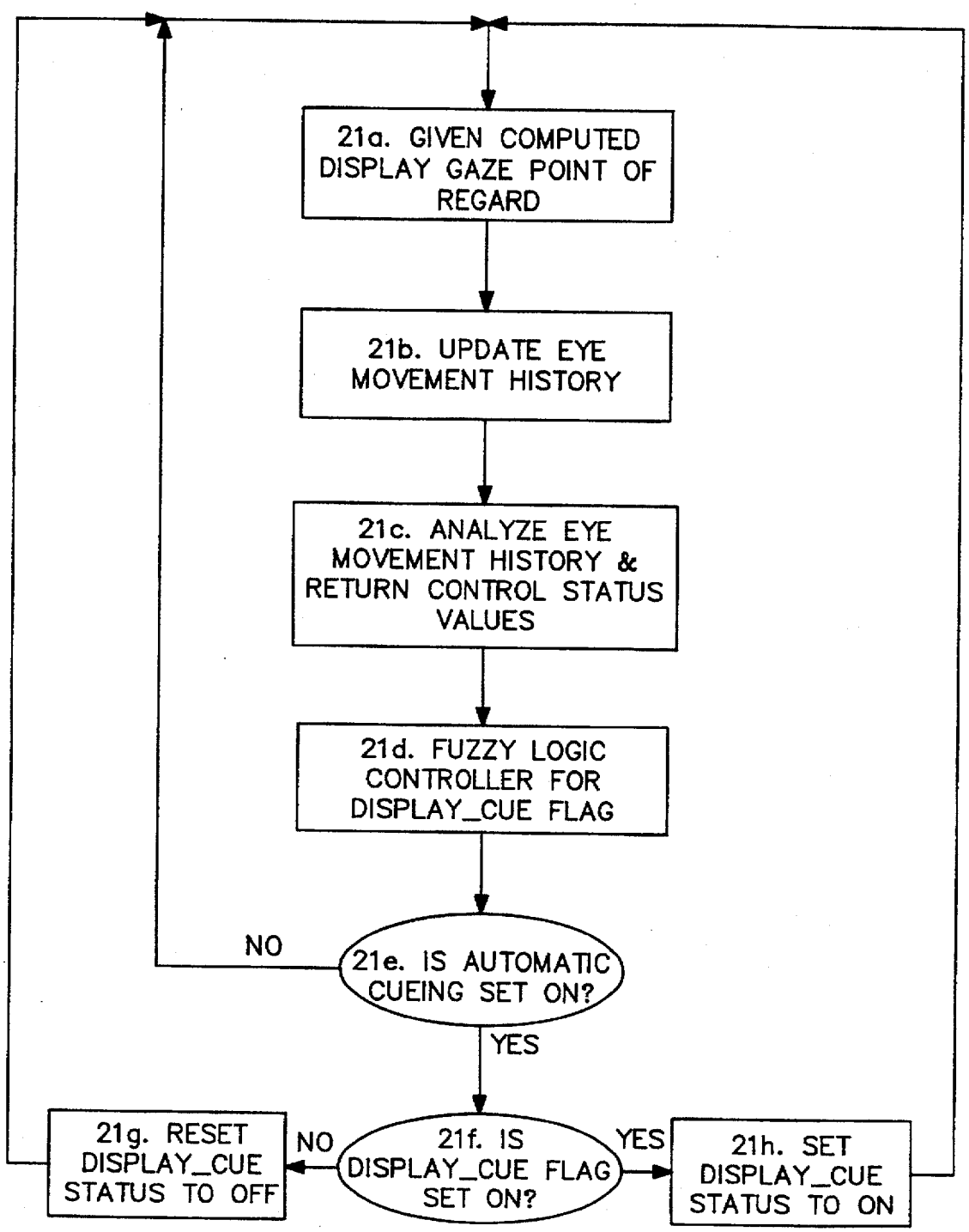
FIG. 8 is a flow chart of the control logic for the automated adaptive display interface used to govern the gaze aiding feedback.

The details of the control logic for the adaptive automated display cueing follow the flow chart of FIG. 8. The computed display gaze point of regard 15 given in global common 21a, is used to update a short term eye movement history file 21b. The eye movement history file is then analyzed 21c for display control clusters. The Fuzzy Logic controller routine 21d classified the control clusters as erratic, intermediate or tight control and uses the control status to determine a display cueing flag. If the user has selected automatic cueing 21e, then the display cueing is activated 21g if the display cueing flag is set or deactivated 21h if the flag has been reset.

Figure 9:
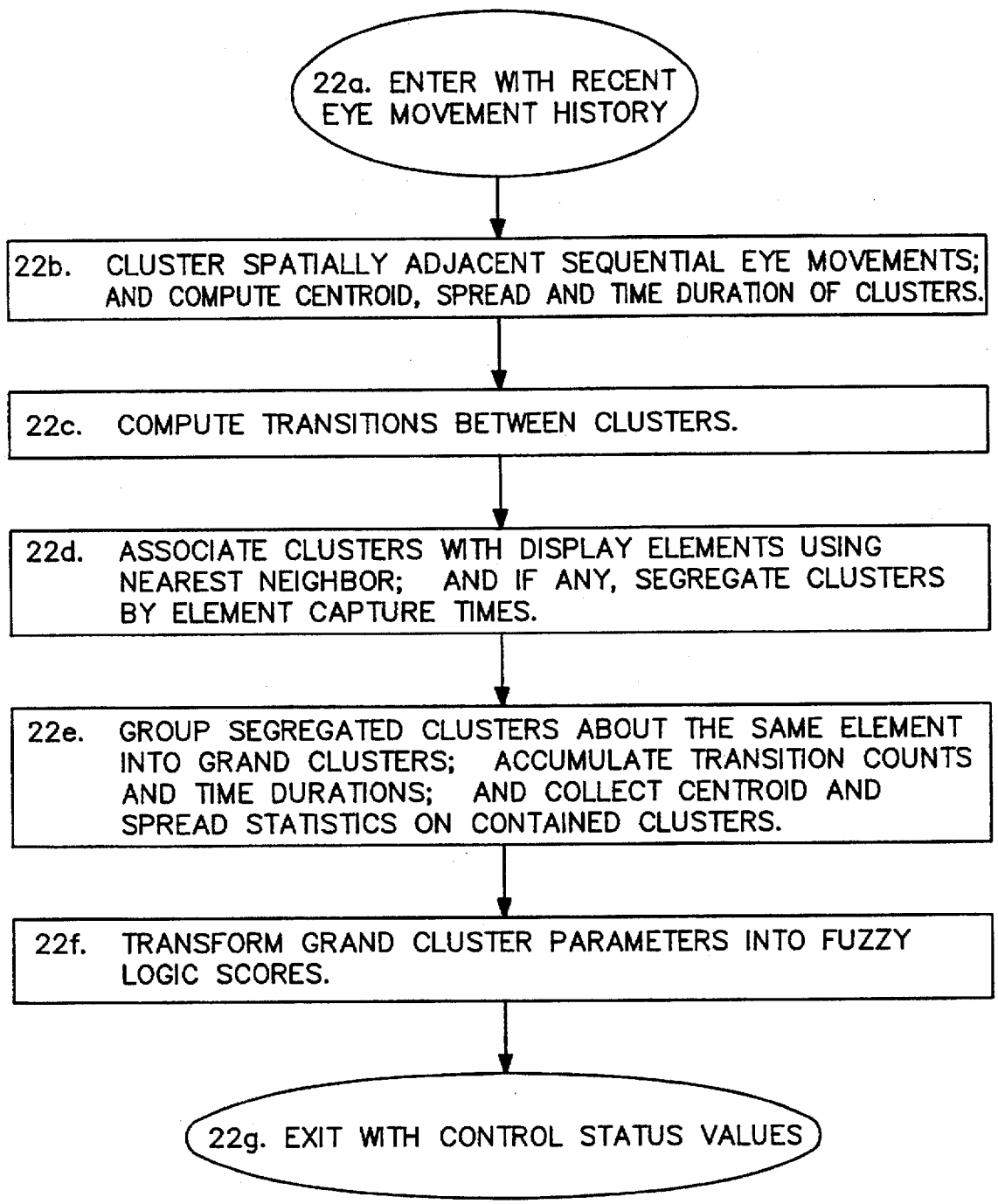
FIG. 9 is a flow chart of the eye movement analysis routine for determining the display control performance.

The heart of the control logic resides in routine 21c which performs an automatic analysis of the eye movements. The routine 21c, flow charted in FIG. 9, is called 22a with the recent eye movement history file 21b. Adjacent sequential eye movements are then spatially clustered 22b and the centroids, spreads and time durations of the clusters are computed; the transitions between the clusters are then computed 22c. In turn, the clusters are associated 22d with the nearest display elements 13 and the associated clusters are segregated by the display element capture times; the clusters for the same captured elements are then grouped 22e into grand clusters with the transition counts and time durations accumulated. The centroid and spread statistics on the clusters contained within the grand clusters are then collected. The cluster parameters are then transformed 22f into Fuzzy Logic scores. The routine exits 22g with the scores for the cluster parameters.

The controller routine 21d classifies the eye control clusters as erratic, intermediate or tight according to Fuzzy Logic classification rules and then on this basis and the display control status sets the display_cue flag controlling the display of the gaze control cues. The controller routine 21d is designed to ensure adaptive stability during periods of mild loading where erratic control may occur when the gaze control cues are not displayed, but tight control would occur when the cues are on. In this case the adaptive interface without routine 21d would flip back and forth between showing and not showing the cues as display control ensures. The routine maintains a running record of the cue control status and the stage of display control.

Figure 10:
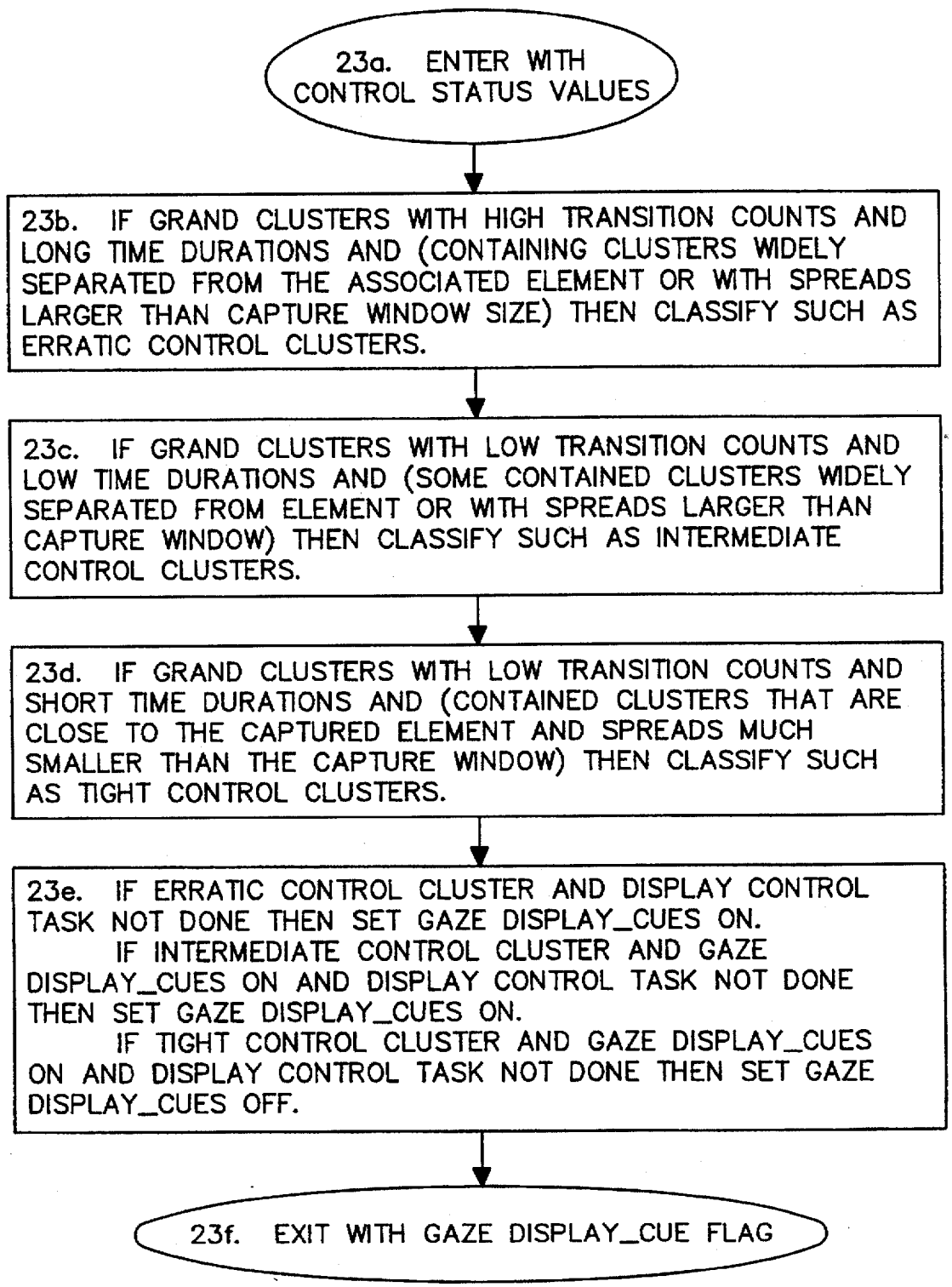
FIG. 10 is a flow chart of the Fuzzy Logic controller routine used in the automated adaptive display interface control of the gaze aiding feedback.

The routine 21d functions as a Fuzzy Logic controller by following the flow chart of FIG. 10. The routine is called 23a with the scored cluster parameters from routine 21c. The routine first performs membership classifications to determine the level of gaze control. Those grand clusters 23b with high values of accumulated transition counts and long time durations, and with contained clusters having centroids widely separated from the associated display element or with spreads larger than the capture window size, are classified as erratic control clusters.

However, those grand clusters 23c with low values of accumulated transition counts and low time durations, but with some contained clusters having centroids widely separated from the associated display element or with spreads larger than the capture window size, are classified as intermediate control clusters.

Finally, all grand clusters found 23d to have low values of accumulated transition counts and short time durations, and have contained clusters that are close to the captured element and spreads much smaller than the capture window, are classified as tight control clusters.

The routine next applies action rules 23e as determined from the gaze control membership, the prior display setting and the stage of task completion. For example, if the control membership is classified as erratic and the display control task is not done then the gaze display_cues are set on. Again, if the membership is intermediate and both the gaze display_cues are on and the display control task is not done, then the gaze display_cues are set on. Finally, if the membership is classified as tight control, the gaze display_cues are on and the display control task is not done, then the gaze display_cues are reset off.

In this way, the invention in the automated mode, serves as a "smart cuer" providing display control cueing that responds naturally to the task loading on the user as indicated by his response time and eye movements. At low levels of task loading, the user need merely gaze at the display element with a concurrent confirmation to operate the menu display. As the manual task loading increases, the user must share more of his attention between the display operations and the manual control, and his confirming activation tends to be delayed. In this case, the invention enhances the gazed element as feedback to the user and the time window for a capture action is expanded. Finally, as the task loading reaches an excessive level, the eye movements of the user during display control become erratic and the adaptive interface if selected, displays gaze control cues to aid him.

Experimental evidence collected by the inventor shows the advantages of using the invention with controllable treed menus on heads-up displays in helicopters. Several military flight qualified volunteers tested a variation of the invention for entering information on controlled treed menus of heads-up (HUD) and panel mounted displays by composing spot report messages during nap-of-earth low level flight in a helicopter simulator.

The message composition was on the average 1.52 times faster with the heads-up display (3.15 seconds per message entry) than with the panel display (4.78 sec per entry). The subjects used the enhancement and gaze control cues more often with the panel display than they did with the heads-up display.

The subjects made on the average 0.67 eye shifts between the cockpit and the external scene with the heads-up, but made 5.88 shifts with the panel displays during message composition. The subjects spend on the average 6.58% of the message composition time looking inside the cockpit with the heads-up display, but 66.57 of the time with the panel display.

The subjects had been instructed to hold specified speed and above ground altitude during a test run and presumably the subjects looked inside the cockpit when using the heads-up display to check the panel instruments for air speed and altitude. Also, the subject would have to momentarily look outside to detect flight obstacles and track terrain when using the panel displays.

A power spectral density analysis of the open-loop flight manual control for the above-ground altitude as measured by the gain, phase, and remnant, shows that the subjects maintained better flight control with the eyetracker during message composition on the heads-up display than they did with the panel display.

I claim:

1. A method for automated adaptive display interface which automates the presentation of gaze aiding cues in response to periods of high cognitive loading of a person performing tasks, comprising the steps of:

maintenance of a record of said person's short term eye movements by a computer to produce a short term eye movement history;

automatic analysis by said computer of said short term eye movement history for determining erratic eye movement patterns about a display element when said short term eye movements fall both into and beyond a predetermined space surrounding said display, element for a certain period of time;

recognition by said computer of said erratic eye movement patterns as representative of periods of high cognitive loading; and instruction by said computer to a video display for the presentation of a gaze cue marker on said video display near said display element and display capture windows on said video display surrounding said display elements during said periods of high cognitive loading.

2. The method of claim 1 wherein said record of said person's short term eye movements contains the locations, start times, and durations of the visual fixation points on said video display.

3. The method of claim 2 wherein said short term eye movement history is computed from said record of said person's short term eye movements from the preceding 10 seconds.

4. The method of claim 3 wherein said gaze cue marker comprises cross-hairs.

5. The method of claim 3 wherein said gaze cue marker comprises a dot.

6. The method of claim 3 wherein each said capture window comprises a rectangle surrounding each said display element.

* * * * *